Jan. 30, 1968  H. O. SUHM ETAL  3,366,234
RECIPROCATING AIR COLUMN SIFTER
Filed July 22, 1965  3 Sheets-Sheet 3
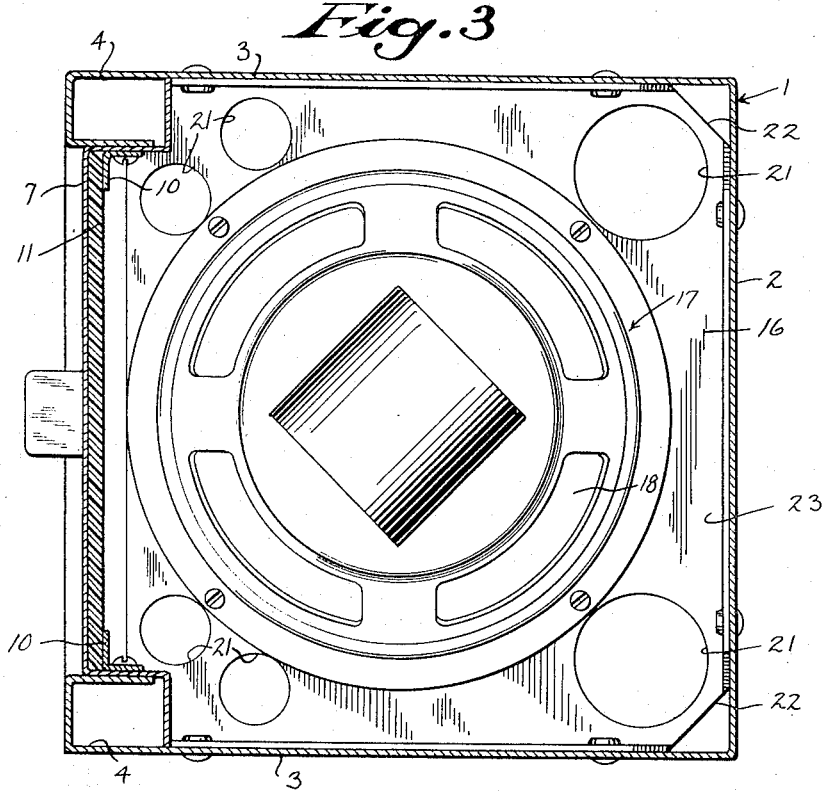
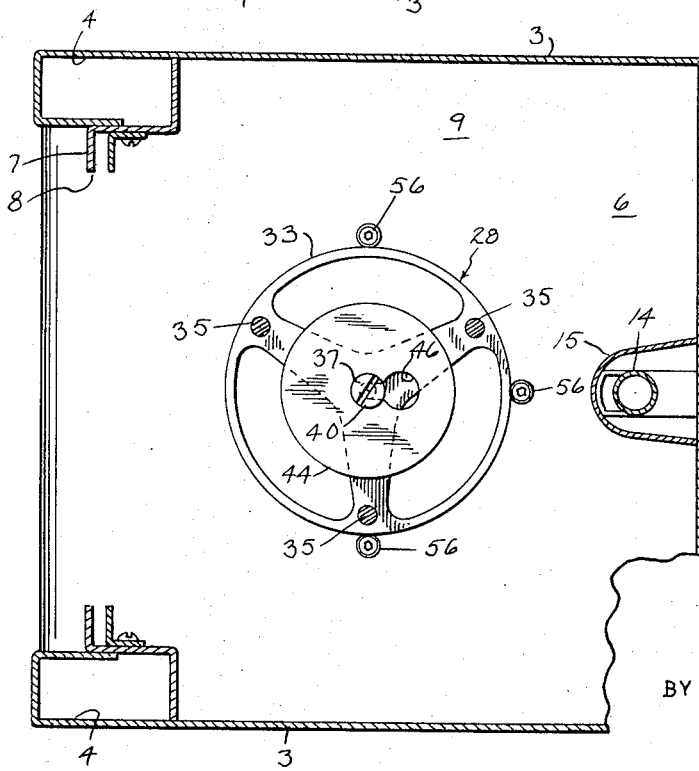
INVENTORS
HOWARD O. SUHM
CHARLES W. WARD
FRANK A. GRABARCZYK
BY Arthur H. Seidel
ATTORNEY

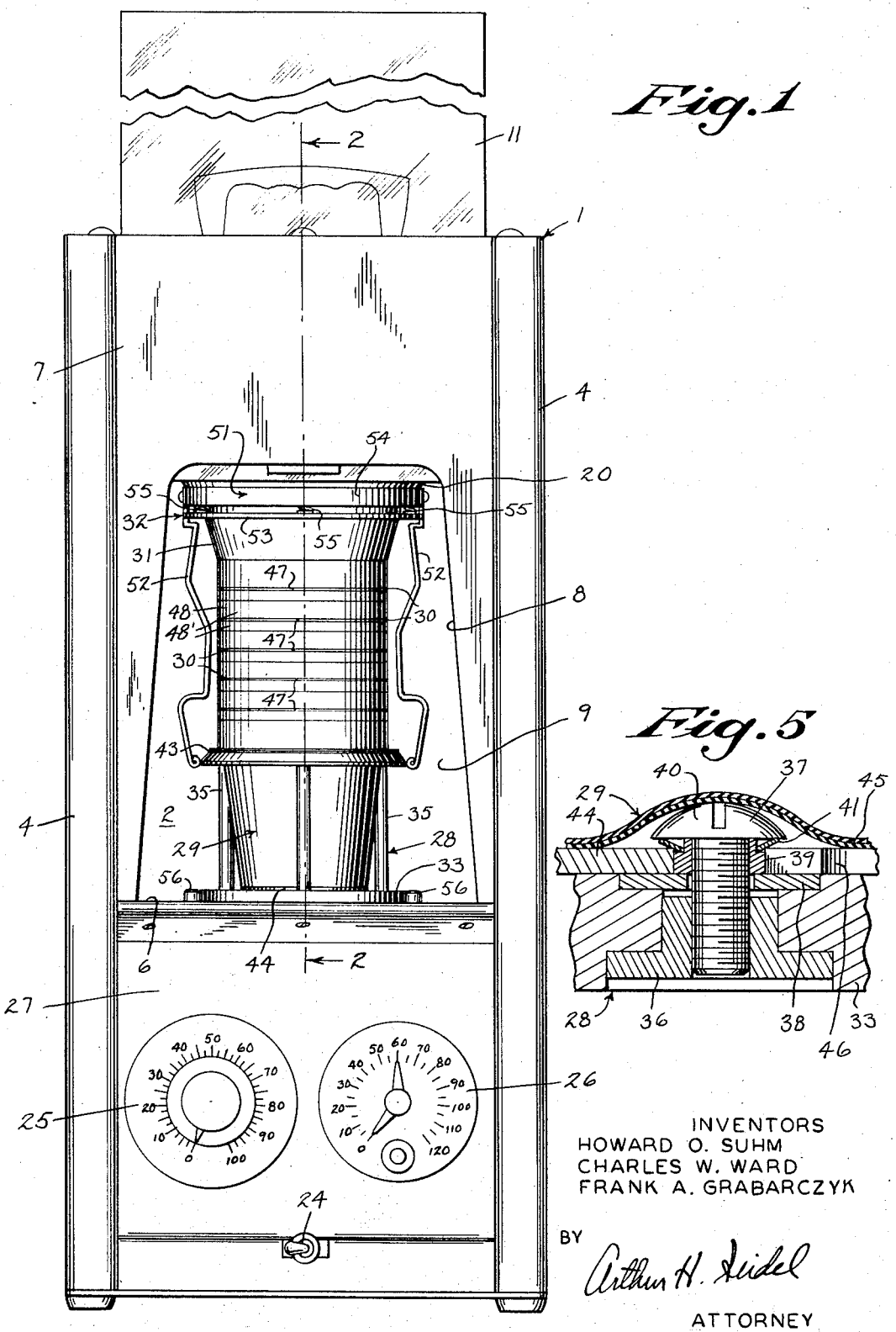

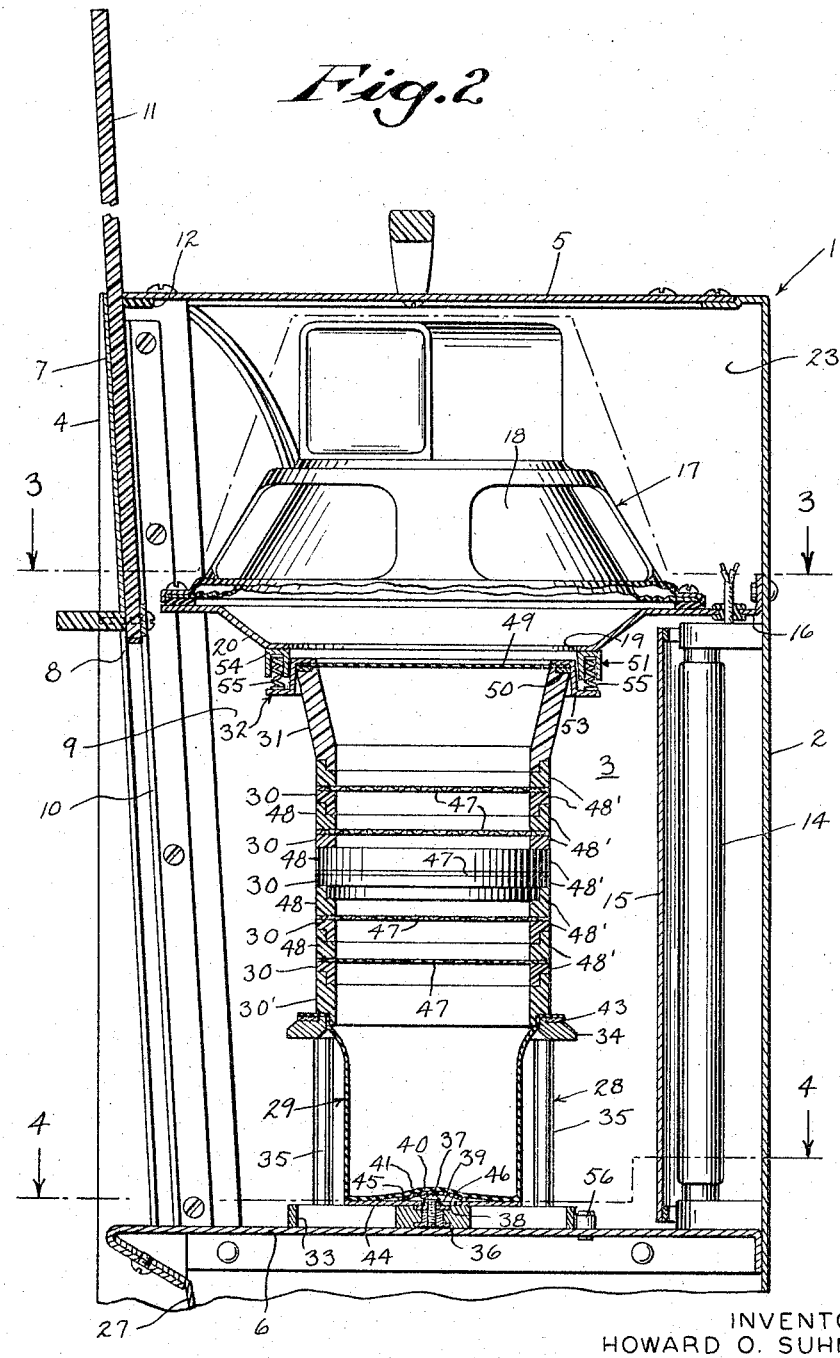

United States Patent Office 3,366,234
Patented Jan. 30, 1968

3,366,234
RECIPROCATING AIR COLUMN SIFTER
Howard O. Suhm, New Berlin, and Charles W. Ward and Frank A. Grabarczyk, Milwaukee, Wis., assignors to Allen-Bradley Company, Milwaukee, Wis., a corporation of Wisconsin
Filed July 22, 1965, Ser. No. 473,949
5 Claims. (Cl. 209—21)

ABSTRACT OF THE DISCLOSURE

A reciprocating air column sifter has a cabinet defining a working chamber, and a speaker faces downwardly through an opening in a support plate which defines the ceiling of the chamber. An enclosed sieve stack assembly defining an air column in the working chamber is in alignment with the speaker. The upper end of the sieve stack assembly is closed off by a flat, substantially impervious elastic diaphragm which faces the speaker, and there is a substantially impervious elastic fines bag at the lower end of the assembly. The speaker has a natural frequency of substantially less than 60 cycles per second, but the sieve stack assembly is constructed to provide enough resistance so that the speaker and assembly together form a mechanical tuned system with a natural frequency near 60 cycles per second to operate at maximum efficiency off a standard A.C. source. The support plate is also the floor of an enclosed chamber for the speaker, and there are openings through the plate to establish communication between the speaker and working chambers, thus minimizing the resistive effect of air behind the speaker. A frame for the fines bag includes a base and a ring above the base, and the bag has a rigid peripheral ring at its upper end which rests on the frame ring and a rigid plate secured to its outside bottom surface which has a keyhole slot to releasably receive a headed post on the frame base.

---

This invention relates to an improved sifter of the reciprocating air column type including a sieve stack assembly which defines and encloses an air column and a speaker which serves as a sonic vibrator to cause reciprocating movement of the air in the column to aid in sifting material down through the stack assembly.

A sifter of the general type contemplated herein is shown in U.S. Patent No. 3,045,817 to C. W. Ward. Although the sifter shown in the Ward patent is very satisfactory, it presents certain problems in tuning. That is, it is necessary for maximum efficiency that the system formed by the speaker and sieve stack assembly, which is essentially a spring-mass system, have a natural frequency closely approximating the frequency of the electrical supply for the speaker so that the two are tuned. Under the Ward patent, it is contemplated that this tuning be accomplished by varying the electrical frequency to match the frequency of the speaker-sieve stack system. This approach, however, requires the inclusion of rather expensive and intricate electrical equipment including a variable oscillator. By contrast, it is the general object of this invention to provide a sifter in which the speaker-stack system is constructed to have a natural frequency closely approximating that of a pre-selected power supply.

It is a specific object of this invention to provide a sifter in which the speaker and the sieve stack assembly form a tuned system which has a natural frequency near sixty cycles per second so that the sifter can be operated at maximum efficiency from a standard source of alternating current.

It is another object of this invention to provide a sifter of this general type which is especially suited for high accuracy applications, such as in laboratory powder analysis.

It is a further object of this invention to provide a sifter in which the sieve stack assembly is completely enclosed to retain all of the material being sifted.

It is still another object of this invention to provide a sifter in which tuning is accomplished primarily by means of the sieve stack assembly which faces the speaker, the area to the rear of the speaker cone being relatively open so that it has no substantial effect on frequency.

It is a still further object of this invention to provide a sifter including means to channel and direct the vibrations established by the speaker for maximum efficiency.

It is still another object of this invention to provide a sifter including an enclosed sieve stack assembly including a number of sieves and other elements, which assembly is easy to put together and handle, and which may readily be disassembled for purposes of cleaning, weighing and the like.

It is a still further object of this invention to provide a sifter having the foregoing advantages which is strong and long wearing, and relatively simple and inexpensive to manufacture and use.

Other objects and advantages will appear from the description to follow. In the description, reference is made to the accompanying drawings, forming a part hereof, in which there is shown, by way of illustration and not of limitation, a preferred embodiment of the invention.

In the drawings:

FIG. 1 is a front view in elevation of a sifter formed according to this invention, FIG. 2 is a partial view in cross-section in the plane 2—2 shown in FIG. 1, FIG. 3 is a view in cross-section in the plane 3—3 shown in FIG. 2, FIG. 4 is a view in cross-section in the plane 4—4 shown in FIG. 2, and FIG. 5 is an enlarged fragmentary view in cross-section showing the locking post assembly for the fines collecting bag of the sifter.

The sifter of the invention is housed in a box-like sheet metal cabinet designated generally by the reference numeral 1, and including a rear wall 2 and opposite side walls 3 all formed from a single piece of material. The vertical front edges of the walls 3 are bent back upon themselves to form vertical channels 4 extending upwardly along the front edges of the cabinet 1. A cover plate 5 encloses the top of the cabinet and is removably secured to inwardly extending flanges formed at the upper edges of the walls 2 and 3.

A flat horizontal floor plate 6 is secured in the cabinet 1 by means of downwardly extending flanges which are riveted to the walls 2 and 3. A front plate 7 of rather complex configuration extends between the walls 3 above the floor 6 and is offset to extend rearwardly and sidewardly and close off the channels 4. A large opening 8 is provided in the plate 7 to allow access to an interior working chamber 9 of the cabinet 1.

A pair of angles 10 are mounted on the plate 7 and with it define opposite parallel channels which slidably receive a vertically movable transparent door 11 which is adapted to close off the opening 8 when the sifter is in use. As can be seen in FIG. 2, a seal 12 is mounted on the front edge of the cover plate 5 and engages the rear surface of the door 11 to insure sealing off the interior of the cabinet 1.

Mounted on the rear wall 2 opposite the opening 8 are a fluorescent tube 14 and a translucent, channel shaped diffuser 15 which together serve to illuminate the chamber 9.

A horizontal support plate 16 is mounted in the cabinet 1 at about the level of the top of the opening 8 by means of upwardly extending flanges which are riveted to the walls 2 and 3. The plate 16 supports a speaker as will be described, and also serves as a partiton to define the top of the chamber 9.

A dynamic speaker 17, which serves as a sonic vibrator as will be described, is disposed above the plate 16. The metal housing of the speaker 17 is secured to the plate 16, with the speaker cone 18 facing downwardly. The speaker 17 is not shown or described in detail since it is conventional in construction and since any of a number of commercially available speakers may be used. The plate 16 has a central circular opening 19 therethrough which is directly under and aligned with the speaker cone 18, and is dished to define a generally funnel-shaped rim 20 that extends downwardly from the plate 16 and surrounds the opening 19. As can be seen in FIG. 2, the opening 19 is smaller than the outer diameter of the cone 18, the opening 19 being approximately four and one-fourth inches in diameter for an ordinary eight inch speaker. The diameter of the opening 19 for speakers of other sizes should also be approximately one-half the speaker cone diameter. The rim 20 acts to channel waves or vibrations generated by the cone 18 through the smaller opening 19 to provide maximum efficiency, and eliminates undesirable edge effects by blanking off the periphery of the cone 18.

As can be seen in FIG. 3, there are a number of circular openings 21 through the plate 16 radially outwardly of the speaker 17, and the rear corners of the plate 16 are cut off to provide additional triangular openings 22. The openings 21 and 22 establish communication between the working chamber 9 and a speaker chamber 23 which houses the speaker 17 and is defined by the plate 16, cover 5, walls 2 and 3 and plate 7, and in effect open up the chamber 23. That is, air in the chamber 23 above the cone 18 is relatively free to move through the openings 21 and 22 into the relatively larger chamber 9 and thus has only a negligible effect on movement of the cone 18. If the chamber 23 were to be completely enclosed, the air behind or above the cone 18 would act like a spring and resist movement of the cone 18 and could have a significant effect on operation. The openings 21 and 22 may be of any shape and should be of maximum area, consistent with structural requirements, to open the chamber 23 as completely as possible. It would be possible to achieve the same effect by having openings through the walls 2 or 3 or the cover 5, but having the openings 21 and 22 in the plate 16 within the cabinet 1 opens the chamber 23 without exposing the speaker 17 to the atmosphere to prevent the entry of dirt.

The portion of the interior of the cabinet 1 below the floor 6 houses a conventional switch 24, power regulator 25 and timer 26 for the speaker 17, all of which are mounted on an oblique panel 27 extending between and secured to the walls 3 and floor 6. Connectors running from these elements to the speaker 17 may be enclosed and concealed in either channel 4.

A sieve stack assembly, seen in FIGS. 1 and 2, is placed in the chamber 9 and may be inserted and removed through the opening 8. This assembly includes: a fines collecting assembly including a frame 28 and a fines collecting bag 29; a sieve assembly including a stack of sieves 30, together with a similar spacer 30', and a funnel 31; and a clamp 32.

The frame 28 is preferably formed of aluminum and comprises a base 33, an upper ring 34 and three vertical connecting legs 35. As can be seen in FIG. 5, the base 33 is provided with a headed central steel insert 36 which extends upwardly from the bottom of the base 33 and threadedly receives a machine screw 37 that extends above the base 33 to serve as a locking post as will be described. A second steel insert 38 is provided at the upper surface of the base 33 and surrounds the screw 37 with a substantial clearance. A collar 39 freely surrounds the shank of the screw 37 between its head 40 and the insert 38 to keep the screw head 40 a predetermined distance above the base 33. The upper portion of the collar 39 is of reduced diameter and a resilient conical washer 41 is freely rotatably seated on this portion and bears against the underside of the head 40.

As can be seen most clearly in FIG. 4, the floor 6 is provided with three upstanding lugs 56 which serve as locating projections for the frame base 33, and position it directly under the speaker 17.

The fines collecting bag 29 is formed of a sprayed latex on the order of two to five thousandths of an inch in thickness. Its upper edge is slightly flared and is adhesively attached to a rigid ring 43 which rests loosely in the recessed outer edge of the ring 34.

The bottom end of the bag 29 is closed and is adhesively secured to a circular flat metal plate 44. As can be seen in FIGS. 2 and 4, the plate 44 is provided with a centrally located keyhole aperture 46 which is adapted to receive the locking post 37. A relatively thick circular rubber sheet 45 is adhesively secured to the bottom of the bag 29 over the slot 46. The closed end of the bag 29 and the sheet 45 are capable of stretching when the screw head 40 projects through the aperture 46, and the thick rubber sheet 45 protects against ripping as a result of repeated insertions of the screw head 40.

The bag 29 is inserted in the frame 28 by placing the ring 43 in the recessed ring 34 and then engaging the plate 44 and locking post 37. This is a relatively simple operation, but the bag 29 is as a result held firmly in place under constant, predetermined tension. There is a reciprocating air movement in the sifter, and this tends repeatedly to pull the plate 44 off the base 33. The steel inserts 36 and 38 are provided to prevent any damage which might occur if the post 37 were simply threaded in the softer aluminum of the base 33. When the bag 29 is in place, the resilient washer 41 is slightly compressed between the screw head 40 and the plate 44 to hold the latter firmly in place. The washer 41 is freely rotatable about the post 37 and this minimizes any tendency for the screw 37 to be loosened by repeated engagements between the underside of the head 40 and the plate 44.

The sieves 30 are of the type described in the co-pending application of Frank A. Grabarczyk, Ser. No. 474,065, filed July 22, 1965. Each comprises a screen 47 and a ring 48, the latter being formed of a rigid, transparent material such as an acrylic plastic. Each ring 48 is formed of two ring portions 48' adhesively secured together with the screen 47 clamped therebetween, the screen 47 extending to the outer circumference of the ring 48 to provide for maximum holding area and strength. The sieves 30 are substantially identical to one another, except that they have different meshes and are arranged in serial order with the one with the most open mesh on top.

As can be seen in FIG. 2, the outer ends of the ring portions 48' are stepped so that the sieves 30 may be stacked with the lower end of one mating with the upper end of the sieve 30 that is below. As can also be seen in FIG. 2, this arrangement provides a straight or smooth inner wall for the stack of sieves 30 with no projections extending into he air column formed by the sieves 30 to cause disturbances in air flow.

The spacer 30' which is below the five sieves 30 is a ring of substantially the same overall configuration as the rings 48. As can be seen in FIG. 2, the lower end of the spacer 30' is received in the ring 34, with the bag 29 between, when the sieve stack is assembled.

The funnel 31 is also formed of a rigid transparent material, and has its lower end stepped and received in the upper end of the uppermost sieve 30. As can be seen in FIG. 2, the upper portion of the funnel 31 flares outwardly toward the opening 19 so that the funnel 31 serves as a funnel for the introduction of material to be sifted and as a duct to further channel waves generated by the speaker cone 18.

Mounted atop the funnel 31 is a protective rubber diaphragm 49, also formed of a sprayed latex from two to five thousandths of an inch in thickness. A rigid metal ring 50 is adhesively secured to the edge of the diaphragm 49 and rests loosely in an annular recess formed on the upper surface of the funnel 31. The diaphragm 49 closes off the upper end of the sieve stack assembly so that the entire assembly is enclosed from the diaphragm 49 to the fines bag 29. All of the elements of the stack, however, can easily be disassembled.

The clamp 32 is of the type described and claimed in the co-pending application of F. F. Loock et al., Ser. No. 473,961, filed July 22, 1965. As can be seen in FIG. 1, it comprises an upper cap assembly 51 and two tongs 52 which extend downwardly to about the level of the ring 34 and have their lower ends curled back to be engageable therewith. As can be seen in FIG. 2, the cap assembly 51 comprises a circular offset rim 53 and a sealing ring 54 closely telescoped thereabout, with the tongs 52 being attached to the sealing ring 54. Six compression springs 55 are seated in recesses in the sealing ring 54 and bear downwardly against a shelf formed on the rim 53 to urge the portions 53 and 54 apart. When the sieve stack assembly is in place, the springs 55 urge the sealing ring 54 upwardly against the rim 20 and the rim 53 downwardly against the diaphragm 49 and funnel 31. This holds the sieve stack assembly firmly in place against the floor 6 and, since the parts 53 and 54 are closely telescoped, closes the gap between the assembly and the rim 20. When it is desired to remove the sieve stack assembly, the tongs 52 are pulled downwardly until their lower ends engage under the ring 34. This pulls the sealing ring 54 downwardly away from the rim 20 so that there is sufficient clearance to remove the sieve stack assembly. The springs 55 then serve to hold the entire sieve stack assembly together while it is being removed from the sifter and transported.

When the sifter is to be used, the sieve stack assembly is removed from the chamber 9 and the clamp 32 and diaphragm 49 are removed. The sample to be sifted is then placed in the assembly through the funnel 31, and the diaphragm 49 and clamp 32 are replaced with the arms 52 of the clamp 32 in engagement with the ring 34 to hold the entire assembly together. The assembly is then inserted into the chamber 9 and the arms 52 are released so that the clamp 32 assumes the position shown in FIGS. 1 and 2. When the power is then applied to the speaker 17, it will serve as a sonic vibrator and establish a reciprocating air movement in the column defined by the sieve stack assembly between the diaphragm 49 and the bag 29, which will in turn cause reciprocating movement of the particles of the sample that aid in sifting the sample down through the sieves 30. The flexible bag 29 is capable of substantial expansion and contraction so that reciprocating air movement is not hampered. After sifting has been completed, the sieve stack assembly is removed and may readily be disassembled for purposes of weighing, cleaning and the like.

The speaker 17 and sieve stack assembly are designed to form a tuned mechanical system which has a natural frequency of approximately sixty cycles per second to match a conventional power supply. That is, the vibrator or speaker 17 and sieve stack assembly form what is essentially a spring-mass system which necessarily has a natural frequency of vibration. It is a primary purpose of the invention to have the system match the frequency of a conventional power supply so that the sifter will operate at maximum efficiency. If the sifter is not thus tuned, there is a substantial increase in power requirement for a given amount of work.

Tuning is accomplished primarily through the design of the sieve stack assembly, and most particularly the diaphragm 49. Any conventional speaker has a natural vibration frequency which is difficult to change, and for most speakers this is less than sixty cycles per second. An ordinary eight inch speaker, for example, may have a natural frequency of approximately forty-five cycles per second. Any resistance encountered by the speaker will, however, cause its natural frequency to be raised and accordingly, the reactance afforded by the sieve assembly is arranged to raise the natural frequency of the entire system to approximately sixty cycles per second. This is accomplished primarily through the medium of the diaphragm 49 which may readily be made of the required stiffness by varying its thickness. The reactance afforded by the bag 29 does not play as large a part because the area of the bag 29 is considerably greater than that of the diaphragm 49. Again, the chamber 23 above the speaker 17 is for all practical purposes open so that the air in it plays no appreciable part in determining the frequency of the system thus making it easier to make the required calculations.

Obviously, many factors, such as the size and mesh of the sieves and even the weight and particle size of the material being sifted, must be taken into account in constructing a well tuned system, and to some extent details of construction may have to be empiricaly tested. The problem is, however, minimized with a sifter formed according to this invention because the area behind the speaker need not be taken into account and because varying the thickness of the flat diaphragm 49 offers a convenient means of making final adjustments. If desired, it would be possible to have diaphragms of several thicknesses which could be used interchangeably to compensate for wide variances in materials being sifted.

When the natural frequency of the speaker and sieve stack assembly system is approximately sixty cycles per second, for example in the range of fifty-seven through sixty-three cycles, the unit will operate at maximum efficiency from a standard sixty cycle source of alternating current, and will require minimum power for a given amount of work.

Although a preferred embodiment of the invention has been shown and described herein, it will be appreciated that various modifications are possible within the scope of the invention. The invention is not, therefore, intended to be limited in any way by the foregoing description except insofar as limitations appear specifically in the following claims.

We claim:

1. A reciprocating air column sifter comprising: a speaker having a natural frequency of substantially less than sixty cycles per second; and an enclosed sieve stack assembly facing the cone of the speaker, said assembly defining an air column and including at least one sieve screen extending across the air column, a flat, substantially impervious elastic diaphragm covering the end of the air column nearest the speaker cone, and substantially impervious elastic fines bag means at the other end of the column, the resistance of the sieve stack assembly to reciprocating air movement being selected to be such that the speaker and sieve stack assembly form a mechanical tuned system having a natural frequency of approximately sixty cycles per second that is adapted to operate off a standard A.C. supply.

2. A reciprocating air column sifter comprising: a cabinet having a working chamber and an enclosed speaker chamber above the working chamber; a support plate separating the working and speaker chambers, said plate having a speaker opening therethrough; an enclosed sieve stack assembly defining a vertical air column positioned in the working chamber under and in alignment with the speaker opening, said assembly including a flat, substantially impervious elastic diaphragm across one end of the air column and facing the speaker, at least one sieve screen across the air column, and substantially impervious elastic fines bag means at the other end of the column; and a speaker with a natural frequency of substantially less than sixty cycles per second disposed in the speaker chamber facing and in alignment with the speaker opening that is operable to establish reciprocating movement of the air in the air column, said speaker and sieve stack assembly forming a mechanical tuned system having a natural frequency of approximately sixty cycles per second, that is adapted to operate off a standard A.S. supply said support plate having at least one additional opening therethrough to establish communication between the speaker and working chambers to provide for relatively free air movement therebetween so that the air in the speaker chamber has no substantial effect on the frequency of said tuned system.

3. A reciprocating air column sifter comprising: a cabinet having a working chamber and a speaker chamber above the working chamber that is closed to the exterior of the cabinet; a support plate separating the working and speaker chambers, said plate having a speaker opening therethrough and being dished to provide a funnel-shaped rim extending below the plate and surrounding the speaker opening, said support plate having at least one additional opening therethrough establishing communication between the speaker and working chambers to provide for relatively free air movement therebetween; a sieve stack assembly defining an air column that is positioned in the working chamber under and in alignment with the speaker opening; and a speaker having a cone of a diameter substantially larger than the speaker opening that is mounted in the speaker chamber on the support plate with the cone in alignment with the speaker opening, said speaker being operable to establish reciprocating movement of the air in the column defined by the sieve stack assembly, said speaker and sieve stack assembly forming a mechanical tuned system having a natural frequency of approximately sixty cycles per second that is adapted to operate off a standard A.C. supply.

4. A reciprocating air column sifter comprising: a cabinet having a working chamber and a speaker chamber above the working chamber; a support plate separating the working and speaker chambers, said plate being provided with a circular speaker opening therethrough and being dished to define a generally funnel-shaped rim extending below the plate and surrounding the speaker opening; an enclosed sieve stack assembly defining an air column and positioned in the working chamber under and in alignment with the speaker opening, said assembly including a bottom frame member, a flexible fines collecting bag supported by the frame member, a stack of sieves above and supported by the frame member, a funnel atop the sieves that flares upwardly and outwardly to terminate at an upper edge in alignment with and of approximately the same diameter as said rim, and a flexible diaphragm across the top of said funnel to enclose the upper portion of the air column defined by the sieve stack assembly; and a speaker having a cone diameter approximately twice as great as the diameter of the speaker opening that is mounted in the speaker chamber on the support plate above and in alignment with the speaker opening and that is operable to establish a reciprocating movement of the air in the column defined by the sieve stack assembly, said speaker and sieve stack assembly forming a mechanical tuned system having a natural frequency of approximately sixty cycles per second that is adapted to operate off a standard A.C. supply.

5. A fines collector assembly for the sieve stack assembly of a reciprocating air column sifter comprising: a rigid frame having a base, a ring spaced above the base, and leg means connecting the ring and the base; a headed locking post extending upwardly from the base; and an upwardly opening substantially impervious elastic fines bag having a rigid peripheral ring at its upper end releasably engaged with the ring of the frame and a rigid plate secured to the outside of its closed bottom end, the plate being provided with a keyhole slot releasably engaged with the locking post, the engagement of the peripheral and frame rings and the plate and locking post serving to hold the walls of the fines bag under a predetermined tension.

References Cited

UNITED STATES PATENTS

| | | | |
|---|---|---|---|
| 1,158,989 | 11/1915 | Berry | 55—505 X |
| 1,758,422 | 5/1930 | Anderson | 209—475 |
| 2,500,008 | 3/1950 | Richardson | 55—15 |
| 2,805,731 | 9/1957 | Kron | 55—341 X |
| 2,847,084 | 8/1958 | Wolfskill | 55—378 X |
| 2,853,154 | 9/1958 | Rivers | 55—378 X |
| 2,907,404 | 10/1959 | Mare | 209—400 X |
| 3,045,817 | 7/1962 | Ward | 209—21 |
| 3,049,235 | 8/1962 | Newburg | 209—21 |
| 3,118,748 | 1/1962 | Delfs | 55—292 |

FOREIGN PATENTS

| | | |
|---|---|---|
| 454,050 | 9/1936 | Great Britain. |

HARRY B. THORNTON, *Primary Examiner.*

R. HALPER, *Assistant Examiner.*

UNITED STATES PATENT OFFICE
CERTIFICATE OF CORRECTION

Patent No. 3,366,234 January 30, 1968

Howard O. Suhm et al.

It is hereby certified that error appears in the above numbered patent requiring correction and that the said Letters Patent should read as corrected below.

Column 4, line 63, for "he" read -- the --; column 6, line 7, for "assembly" read -- stack assembly --; line 24, for "empiricaly" read -- empirically --; line 70, for "fiat" read -- flat --; column 7, line 8, for "A.S." read -- A.C. --.

Signed and sealed this 18th day of March 1969.

(SEAL)
Attest:

Edward M. Fletcher, Jr.

Attesting Officer

EDWARD J. BRENNER

Commissioner of Patents